US010400390B2

(12) United States Patent
Sakaguchi

(10) Patent No.: US 10,400,390 B2
(45) Date of Patent: Sep. 3, 2019

(54) FIBER SIZING AGENT COMPOSITION, FIBER SIZING AGENT DISPERSION, FIBER SIZING AGENT SOLUTION, METHOD FOR PRODUCING FIBER BUNDLES, COMPOSITE INTERMEDIATE AND FIBER-REINFORCED COMPOSITE MATERIAL

(71) Applicant: SANYO CHEMICAL INDUSTRIES, LTD., Kyoto (JP)

(72) Inventor: Sayaka Sakaguchi, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 60 days.

(21) Appl. No.: 15/509,251

(22) PCT Filed: Sep. 1, 2015

(86) PCT No.: PCT/JP2015/074823
§ 371 (c)(1),
(2) Date: Mar. 7, 2017

(87) PCT Pub. No.: WO2016/043043
PCT Pub. Date: Mar. 24, 2016

(65) Prior Publication Data
US 2017/0284015 A1    Oct. 5, 2017

(30) Foreign Application Priority Data
Sep. 19, 2014   (JP) ................................. 2014-191101

(51) Int. Cl.
| | |
|---|---|
| D06M 15/507 | (2006.01) |
| D06M 13/188 | (2006.01) |
| D06M 13/282 | (2006.01) |
| D06M 13/285 | (2006.01) |
| D06M 13/328 | (2006.01) |
| D06M 13/395 | (2006.01) |
| D06M 13/463 | (2006.01) |
| D06M 13/288 | (2006.01) |
| D06M 13/325 | (2006.01) |
| D06M 13/46 | (2006.01) |
| D06M 15/263 | (2006.01) |
| D06M 15/55 | (2006.01) |
| D06M 15/564 | (2006.01) |
| D06M 15/572 | (2006.01) |
| D06M 15/59 | (2006.01) |
| C03C 25/24 | (2018.01) |
| C03C 25/32 | (2018.01) |
| C08J 5/04 | (2006.01) |
| C08J 5/06 | (2006.01) |
| C08L 63/00 | (2006.01) |
| C08L 67/02 | (2006.01) |

(Continued)

(52) U.S. Cl.
CPC ........... *D06M 15/507* (2013.01); *C03C 25/24* (2013.01); *C03C 25/323* (2013.01); *C08J 5/042* (2013.01); *C08J 5/06* (2013.01); *C08L 63/00* (2013.01); *C08L 67/02* (2013.01); *C08L 67/025* (2013.01); *D06M 13/188* (2013.01); *D06M 13/282* (2013.01); *D06M 13/285* (2013.01); *D06M 13/325* (2013.01); *D06M 13/328* (2013.01); *D06M 13/395* (2013.01); *D06M 13/463* (2013.01); *D06M 15/572* (2013.01); *D06M 2101/40* (2013.01); *D06M 2200/40* (2013.01)

(58) Field of Classification Search
CPC ............. D06M 13/395; D06M 15/507; D06M 15/572; D06M 15/55; D06M 15/59; D06M 15/263; D06M 15/564; C03C 25/24; C03C 25/323; C08L 67/02; C08L 67/025; C08L 63/00–10; C09D 167/02; C09D 167/025; C09D 163/00–10; C09J 167/02; C09J 167/025; C09J 163/00–10
See application file for complete search history.

(56) References Cited

U.S. PATENT DOCUMENTS

| | | | |
|---|---|---|---|
| 6,586,523 B1 | 7/2003 | Blum et al. | |
| 2003/0087992 A1* | 5/2003 | Togashi | C08G 59/30 523/440 |

(Continued)

FOREIGN PATENT DOCUMENTS

| | | |
|---|---|---|
| EP | 1 600 464 | 11/2005 |
| EP | 2 149 637 | 2/2010 |

(Continued)

OTHER PUBLICATIONS

Machine translation of JP 2014-162999 A.*
International Search Report dated Dec. 1, 2015 in corresponding International (PCT) Application No. PCT/JP2015/074823.

*Primary Examiner* — Kregg T Brooks
(74) *Attorney, Agent, or Firm* — Wenderoth, Lind & Ponack, L.L.P.

(57) ABSTRACT

The present invention provides a fiber sizing agent composition containing a polyester resin (A) and a reactive compound (B), wherein the polyester resin (A) is a polyester resin having an HLB of 4 to 18 and a viscosity at 30° C. of 10 to 1,000,000 Pa·s, the reactive compound (B) is at least one reactive compound selected from the group consisting of blocked isocyanates, tertiary amines, tertiary amine salts, quaternary ammonium salts, quaternary phosphonium salts, and phosphine compounds, and the weight ratio of the polyester resin (A) to the reactive compound (B) [(A)/(B)] in the fiber sizing agent composition is 99.9/0.1 to 10/90.

16 Claims, No Drawings

(51) Int. Cl.
  *C03C 25/323* (2018.01)
  *D06M 101/40* (2006.01)

(56) References Cited

U.S. PATENT DOCUMENTS

| | | | |
|---|---|---|---|
| 2009/0191795 A1* | 7/2009 | Kuwabara | B24B 37/042 |
| | | | 451/41 |
| 2010/0159243 A1 | 6/2010 | Inoue | |
| 2013/0089736 A1 | 4/2013 | Nakayama et al. | |
| 2014/0228481 A1* | 8/2014 | Inoue | C08J 5/06 |
| | | | 523/222 |

FOREIGN PATENT DOCUMENTS

| | | | | |
|---|---|---|---|---|
| JP | 2-84558 | 3/1990 | | |
| JP | 2008-95222 | 4/2008 | | |
| JP | 2013-177704 | 9/2013 | | |
| JP | 2014-162999 | 9/2014 | | |
| JP | 2014-163000 | 9/2014 | | |
| RU | 2013 103 780 | 8/2014 | | |
| WO | 2008/143325 | 11/2008 | | |
| WO | 2013/041902 | 3/2013 | | |
| WO | WO-2013042367 A1 * | 3/2013 | | C08J 5/06 |

\* cited by examiner

FIBER SIZING AGENT COMPOSITION, FIBER SIZING AGENT DISPERSION, FIBER SIZING AGENT SOLUTION, METHOD FOR PRODUCING FIBER BUNDLES, COMPOSITE INTERMEDIATE AND FIBER-REINFORCED COMPOSITE MATERIAL

TECHNICAL FIELD

The present invention relates to a fiber sizing agent composition. More specifically, the present invention relates to a fiber sizing agent composition for use in fiber-reinforced composite materials.

BACKGROUND ART

Composite materials of various kinds of fibers and matrix resins such as unsaturated polyester resins, phenolic resins, and epoxy resins are widely used in fields including building materials, sporting goods, leisure goods, and aircraft. Examples of fibers used in these composite materials include aramid fibers, glass fibers, carbon fibers, ceramic fibers, metal fibers, mineral fibers, rock fibers, and slug fibers. Among these fibers, carbon fibers are used for high-performance fiber-reinforced composite materials because carbon fibers have excellent tensile strength. Carbon fibers are usually produced in the form of filaments or tows, and processed, for example, into unidirectionally aligned sheets, filament winding, textiles, or chopped fibers for use. In the processing of carbon fibers, usually, a sizing agent is added to filaments or tows to prevent fluffing or breakage of yarn.

Composite materials having higher strength are in demand these days for use in various applications. Thus, developments have been carried out to improve the strength of composite materials by adding a new function to sizing agents.

For example, Patent Literature 1 discloses a composite material made of fiber bundles that have been sizing-treated with a sizing agent containing a specific epoxy compound. Patent Literature 2 discloses a composite material made of fiber bundles that have been sizing-treated with a sizing agent containing a rubber latex containing an epoxy group. Patent Literature 3 and Patent Literature 4 disclose composite materials made of fiber bundles that have been sizing-treated with a sizing agent containing blocked isocyanate.

CITATION LIST

Patent Literature

Patent Literature 1: JP-A 2013-177704
Patent Literature 2: JP-A 2008-95222
Patent Literature 3: JP-A H02-84558
Patent Literature 4: JP-A 2014-162999

SUMMARY OF INVENTION

Technical Problem

The sizing agents proposed in Patent Literature 1 and Patent Literature 2 fail to impart sufficient sizing properties to fiber bundles or sufficient strength to composite materials. The sizing agents proposed in Patent Literature 3 and Patent Literature 4 cannot suppress fluffing of fiber bundles and thus fail to impart sufficient strength to composite materials.

An object of the present invention is to provide a fiber sizing agent composition capable of imparting excellent sizing properties to fiber bundles and excellent tensile strength to a fiber-reinforced composite material made of the fiber bundles.

Solution to Problem

The present inventor conducted intensive studies repeatedly to solve the above problems. As a result, the present inventor arrived at the present invention. Specifically, the present invention provides a fiber sizing agent composition containing a polyester resin (A) and a reactive compound (B), wherein the polyester resin (A) is a polyester resin having an HLB of 4 to 18 and a viscosity at 30° C. of 10 to 1,000,000 Pa·s; the reactive compound (B) is at least one reactive compound selected from the group consisting of blocked isocyanates, tertiary amines, tertiary amine salts, quaternary ammonium salts, quaternary phosphonium salts, and phosphine compounds, and the weight ratio of the polyester resin (A) to the reactive compound (B) [(A)/(B)] in the fiber sizing agent composition is 99.9/0.1 to 10/90. The present invention also provides a fiber sizing agent dispersion containing water or an organic solvent and the fiber sizing agent composition dispersed in the water or the organic solvent; a fiber sizing agent solution containing water or an organic solvent and the fiber sizing agent composition dissolved in the water or the organic solvent; a method for producing fiber bundles including treating fibers with the fiber sizing agent dispersion or the fiber sizing agent solution; a composite intermediate containing the fiber bundles obtained by the production method and a matrix resin; and a fiber-reinforced composite material obtained by molding the composite intermediate.

Advantageous Effects of Invention

The fiber sizing agent composition of the present invention is excellent in emulsion stability, and provides an effect of imparting excellent sizing properties to fiber bundles and an effect of suppressing fluffing. A fiber-reinforced composite material made of the fiber bundles has excellent tensile strength.

DESCRIPTION OF EMBODIMENTS

The fiber sizing agent composition of the present invention contains a polyester resin (A). The polyester resin (A) has two or more ester bonds in the molecule.

The polyester resin (A) has an HLB of 4 to 18 and a viscosity at 30° C. of 10 to 1,000,000 Pa·s.

Herein, the HLB is a value determined by the Griffin's method. The polyester resin (A) has an HLB of 4 to 18, preferably 5 to 17, more preferably 6 to 16.

If the HLB is less than 4 or more than 18, fiber bundles have increased fluffing. Thus, the resulting composite material has lower strength.

The polyester resin (A) has a viscosity at 30° C. of 10 to 1,000,000 Pa·s, preferably 20 to 500,000 Pa·s, more preferably 50 to 100,000 Pa·s.

If the viscosity is less than 10 Pa·s, fiber bundles have increased fluffing. If the viscosity is more than 1,000,000 Pa·s, fiber bundles have excessively high sizing properties, which results in poor fiber spreading properties.

<Method for Measuring the Viscosity of Polyester Resin>

Herein, the viscosity of the polyester resin (A) is a complex viscosity, which can be measured, for example, with a viscoelasticity measuring device (e.g., ARES available from Rheometric Scientific, Inc.).

Measurement conditions are as follows.
Sample fixing jig: Disk with a diameter of 25 mm
Gap distance: 0.25 mm
Strain: 1%
Frequency: 1 Hz
Temperature: 30° C.

The polyester resin (A) has an ester group concentration of preferably 10 mmol/g or lower, more preferably 5 mmol/g or lower, based on the weight of the polyester resin (A). If the ester group concentration is too high, the polyester resin (A) may have increased viscosity, which decreases the effect of suppressing fluffing of fiber bundles.

The lower limit of the ester group concentration in the polyester resin (A) is not particularly limited, but it is preferably at least 0.5 mmol/g based on the weight of the polyester resin (A).

The ester group concentration can be determined, for example, by NMR.

The polyester resin (A) is preferably a condensate of a dicarboxylic acid (a1) and/or a dicarboxylic anhydride (a2) and one or more diols (b).

Examples of the dicarboxylic acid (a1) include chain saturated dicarboxylic acids, chain unsaturated dicarboxylic acids, alicyclic dicarboxylic acids, dimer acids, and aromatic dicarboxylic acids.

Examples of chain saturated dicarboxylic acids include C2-C22 linear or branched chain saturated dicarboxylic acids (such as oxalic acid, malonic acid, succinic acid, glutaric acid, methylsuccinic acid, ethylsuccinic acid, dimethylmalonic acid, α-methylglutaric acid, β-methylglutaric acid, 2,4-diethylglutaric acid, isopropylmalonic acid, adipic acid, pimelic acid, suberic acid, azelaic acid, sebacic acid, decanedicarboxylic acid, undecanedicarboxylic acid, dodecanedicarboxylic acid, tridecanedicarboxylic acid, tetradecanedicarboxylic acid, hexadecanedicarboxylic acid, octadecanedicarboxylic acid, icosanedicarboxylic acid, decylsuccinic acid, dodecylsuccinic acid, and octadecylsuccinic acid).

Examples of chain unsaturated dicarboxylic acids include C4-C22 linear or branched chain unsaturated dicarboxylic acids (such as maleic acid, fumaric acid, citraconic acid, mesaconic acid, dodecenylsuccinic acid, pentadecenylsuccinic acid, and octadecenylsuccinic acid).

Examples of alicyclic dicarboxylic acids include C7-C14 alicyclic dicarboxylic acids (such as 1,3- or 1,2-cyclopentane dicarboxylic acid, 1,2-, 1,3-, or 1,4-cyclohexane dicarboxylic acid, 1,2-, 1,3-, or 1,4-cyclohexane diacetic acid, and dicyclohexyl-4,4'-dicarboxylic acid).

Examples of dimer acids include dimers of C8-C24 chain unsaturated carboxylic acids (such as oleic acid, linoleic acid, and linolenic acid).

Examples of aromatic dicarboxylic acids include C8-C14 aromatic dicarboxylic acids (such as terephthalic acid, isophthalic acid, phthalic acid, phenylmalonic acid, phenylsuccinic acid, β-phenylglutaric acid, α-phenyladipic acid, β-phenyladipic acid, biphenyl-2,2'- and 4,4'-dicarboxylic acid, naphthalene dicarboxylic acid, sodium 5-sulfoisophthalate, and potassium 5-sulfoisophthalate).

Examples of the dicarboxylic anhydride (a2) include anhydrides of the dicarboxylic acid (a1) such as succinic anhydride, maleic anhydride, and phthalic anhydride.

Any of these examples of the dicarboxylic acid (a1) and the dicarboxylic anhydride (a2) may be used alone or in combination of two or more thereof. Preferred among these in view of sizing properties are chain saturated dicarboxylic acids, chain unsaturated dicarboxylic acids, and aromatic dicarboxylic acids. More preferred are oxalic acid, malonic acid, succinic acid, adipic acid, sebacic acid, maleic acid, fumaric acid, terephthalic acid, isophthalic acid, phthalic acid, and combinations of two or more thereof. Particularly preferred are adipic acid, maleic acid, fumaric acid, terephthalic acid, isophthalic acid, and combinations of two or more thereof.

Examples of the diol (b) include aliphatic alkanediols and alkylene oxide (hereinafter abbreviated to AO) adducts thereof, alicyclic diols and AO adducts thereof, AO adducts of primary amines, and AO adducts of aromatic ring-containing dihydric phenols.

Examples of aliphatic alkanediols include those having a carbon number of 2 to 16, such as ethylene glycol, 1,2-propylene glycol, 1,3-propylene glycol, 1,4-butanediol, 1,6-hexanediol, octanediol, decanediol, dodecanediol, hexadecanediol, neopentyl glycol, and 2,2-diethyl-1,3-propanediol. Examples of AO adducts of aliphatic alkanediols include compounds obtained by adding a C2-C4 AO to any of the above diols. Examples of C2-C4 AO include ethylene oxide (hereinafter abbreviated to EO), 1,2-propylene oxide (hereinafter abbreviated to PO), and 1,2-butylene oxide and 1,4-butylene oxide(hereinafter abbreviated to BO). These two or more types of AO may be used in combination. Two or more types of AO may be added in a random and/or block form when used in combination. The addition mole number of AO per molecule of aliphatic alkanediol is usually 1 to 120 moles.

Examples of alicyclic diols include those having a carbon number of 4 to 16, such as 1,4-cyclohexanediol, 1,4-cyclohexane dimethanol, and hydrogenated bisphenol A. Examples of AO adducts of alicyclic diols include compounds obtained by adding a C2-C4 AO to any of the above diols.

As for AO adducts of primary amines, examples of the primary amines include primary amines having a carbon number of 1 to 22, such as methylamine, ethylamine, propylamine, butylamine, octylamine, decylamine, and dodecylamine. Examples of AO adducts of primary amines include compounds obtained by adding a C2-C4 AO to any of the above amines.

As for AO adducts of aromatic ring-containing dihydric phenols, examples of the aromatic ring-containing dihydric phenols include bisphenol A, bisphenol S, cresol, and hydroquinone. Examples of AO adducts of aromatic ring-containing dihydric phenols include a compound obtained by adding a C2-C4 AO to any of the above phenols.

Preferred among the examples of the diol (b) in view of emulsion stability of the sizing agent are aliphatic alkanediols and AO adducts thereof, AO adducts of alicyclic diols, AO adducts of primary amines, AO adducts of aromatic ring-containing dihydric phenols, and combinations of two or more thereof. More preferred are aliphatic alkanediols and AO adducts thereof, AO adducts of aromatic ring-containing dihydric phenols, and combinations of two or more thereof.

In view of suppression of fluffing of fiber bundles and emulsion stability of the sizing agent, at least one of the diols (b) to be used is preferably a diol (b1) having an average of 5 to 200 oxyethylene groups. Preferably, the diol (b1) is a diol having an average of 10 to 100 oxyethylene groups.

The use of the diol (b1) can suppress fluffing of fiber bundles and impart excellent emulsion stability.

Examples of the diol (b1) having an average of 5 to 200 oxyethylene groups include the following compounds among the above-exemplified diols.

Among AO adducts of aromatic ring-containing dihydric phenols, primary amines, or alicyclic diols, those in which an average of 5 to 200 moles of EO is added can be exemplified. Specific examples thereof include EO (10 mol) adducts of bisphenol A, EO (40 mol) adducts of bisphenol A, EO (100 mol) adducts of bisphenol A, and EO (200 mol) adducts of bisphenol A.

Among AO adducts of C3-C4 aliphatic alkanediols, those having an average of 5 to 200 moles of EO can be exemplified. Specific examples thereof include EO (5 mol) adducts of propylene glycol, PO (2 mol)/EO (20 mol) adducts (block adducts) of propylene glycol, PO (5 mol)/EO (100 mol) adducts (block adducts) of propylene glycol, and PO (5 mol)/EO (100 mol) adducts (random adducts) of propylene glycol.

Among AO adducts of ethylene glycol, those in which the average addition mole number of EO is 4 to 199 can be exemplified. Specific examples thereof include polyethylene glycols such as EO (4 mol) adducts of ethylene glycol and EO (199 mol) adducts of ethylene glycol.

Among the examples of the diols (b1) having an average of 5 to 200 oxyethylene groups, EO adducts of bisphenol A and/or EO adducts of ethylene glycol are preferred in view of suppression of fluffing of fiber bundles.

The average number of oxyethylene groups per diol (b) can be determined by NMR measurement of the diols (b), when the diols (b) can be isolated from the polyester resin (A), for example.

When the diols (b) cannot be isolated from the polyester resin (A), the average number of oxyethylene groups can be determined as follows, for example: the polyester resin (A) is hydrolyzed to obtain a mixture containing a diol; the mixture containing a diol is fractionated by preparative gel permeation chromatography (hereinafter referred to as preparative GPC); and the fractionated components are subjected to NMR measurement to identify the structure.

Preparative GPC may be carried out under the following measurement conditions, for example.
Model: LC-09 (Japan Analytical Industry Co., Ltd.)
Column: JAIGEL-3H
+JAIGEL-2H
+JAIGEL-1H
Column temperature: 25° C.
Solvent: Chloroform
Flow rate: 3 ml/min
Sample concentration: 2% by weight
Amount of injection: 3 ml Examples of methods for producing the polyester resin (A) include one in which the dicarboxylic acid (a1) and/or the dicarboxylic anhydride (a2) and the diol(s) (b) are fed at a predetermined molar ratio, and water is removed by distillation while the mixture is stirred at a reaction temperature of 100° C. to 250° C. under a pressure of −0.1 to 1.2 MPa. Additional diol (b) may be added to the reaction mixture for reaction.

In the production of the polyester resin (A), a catalyst is preferably added in an amount of 0.05 to 0.5% by weight based on the weight of the polyester resin (A). Examples of catalysts include p-toluenesulfonic acid, dibutyltin oxide, tetraisopropoxy titanate, and potassium titanium oxalate. In view of reactivity and environmental impact, tetraisopropoxy titanate and potassium titanium oxalate are preferred, and potassium titanium oxalate is more preferred.

The fiber sizing agent composition of the present invention contains a reactive compound (B).

The reactive compound (B) is at least one selected from the group consisting of blocked isocyanates, tertiary amines, tertiary amine salts, quaternary ammonium salts, quaternary phosphonium salts, and phosphine compounds.

The term "blocked isocyanate" refers to an isocyanate compound in which isocyanate groups (—NCO) are blocked with a blocking agent. In such a blocked isocyanate, the reactivity of the isocyanate groups is suppressed. When the blocking agent is dissociated upon heating, the reactivity of the isocyanate groups is recovered.

Examples of isocyanate compounds include aliphatic isocyanates, alicyclic isocyanates, aromatic-aliphatic isocyanates, aromatic isocyanates, and modified polyisocyanates.

Examples of aliphatic isocyanates include octadecyl isocyanate, ethylene diisocyanate, tetramethylene diisocyanate, hexamethylene diisocyanate (HDI), heptamethylene diisocyanate, octamethylene diisocyanate, decamethylene diisocyanate, dodecamethylene diisocyanate, 2,2,4- or 2,4,4-trimethylhexamethylene diisocyanate, lysine diisocyanate, 2,6-diisocyanato methyl caproate, 2,6-diisocyanato ethyl caproate, bis(2-isocyanatoethyl)fumarate, bis(2-isocyanatoethyl)carbonate, 1,6,11-undecane triisocyanate, 1,8-diisocyanate-4-isocyanate methyloctane, 1,3,6-hexamethylene triisocyanate, lysine ester triisocyanate (a phosgenation product of a reaction product of lysine and alkanolamine), 2-isocyanatoethyl-2,6-diisocyanato hexanoate, and 2- or 3-isocyanatopropyl-2,6-diisocyanato hexanoate.

Examples of alicyclic isocyanates include isophorone diisocyanate (IPDI), dicyclohexylmethane-4,4'-diisocyanate (hydrogenated MDI), cyclohexylene diisocyanate, methylcyclohexylene diisocyanate, bis(2-isocyanatoethyl)-4-cyclohexene-1,2-dicarboxylate, 2,5- or 2,6-norbornane diisocyanate, and bicycloheptane triisocyanate.

Examples of aromatic-aliphatic isocyanates include m- or p-xylylene diisocyanate (XDI), diethylbenzene diisocyanate, and α,α,α',α'-tetramethylxylylene diisocyanate (TMXDI).

Examples of aromatic isocyanates include 1,3- or 1,4-phenylene diisocyanate, 2,4- or 2,6-tolylene diisocyanate (TDI), 4,4'- or 2,4'-diphenylmethane diisocyanate (MDI), m- or p-isocyanatophenylsulfonyl isocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, crude TDI, and crude MDI (polymethylene polyphenylene polyisocyanate).

Examples of modified polyisocyanates include urethane-modified products of polyisocyanates such as MDI, TDI, HDI, and IPDI (isocyanate-terminated urethane prepolymers obtained by reacting a polyol and an excess amount of polyisocyanate) and isocyanate-terminated polyol adduct polyisocyanates which are obtained by reacting the above polyisocyanates with compounds having an active hydrogen atom (such as trimethylolpropane or pentaerythritol) at a molar ratio of isocyanate groups (—NCO) to hydroxyl groups (—OH) of more than 1.

Preferred among these isocyanate compounds in view of sizing properties of fiber bundles are aromatic-aliphatic isocyanates and aromatic isocyanates. More preferred are aromatic isocyanates. Specific examples thereof include XDI, TDI, and MDI.

Any blocking agent may be used. Specific examples thereof include lactams (such as ε-caprolactam, δ-valerolactam, and γ-butyrolactam), phenols (such as phenol, cresol, ethylphenol, butylphenol, nonylphenol, and dinonylphenol), oximes (such as methyl ethyl ketone oxime, acetophenone oxime, and benzophenone oxime), alcohols (such as methanol, ethanol, butanol, and cyclohexanol), active methylenes (such as dimethyl malonate, diethyl malonate, methyl acetoacetate, ethyl acetoacetate, and acetylacetone), mercaptans (such as butyl mercaptan and dodecyl mercaptan), amides (such as acetanilide and acetic acid amide), imides (such as succinimide and maleimide), sulfites (such as sodium bisulfite), cellosolves (such as methyl cellosolve, ethyl cellosolve, butyl cellosolve, and hexyl cellosolve), pyrazoles (such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole), amines (such as dimethylamine, diethylamine, di-n-propylamine, dicyclohexylamine, diphenylamine, xylysine, N,N-diethylhydroxylamine, 2-hydroxypyridine, and 2-mercaptopyridine), and triazoles. Mixtures of two or more of these may be used.

Preferred among these blocking agents in view of tensile strength of the resulting composite materials are alcohols, phenols, active methylenes, oximes, lactams, amines, and mixtures thereof. More preferred are oximes, pyrazoles, amines, triazoles, and mixtures thereof. Particularly preferred are amines.

Examples of commercially available blocked isocyanates include DM-6400, Meikanate DM-3031 CONC, Meikanate DM-35HC, Meikanate TP-10, Meikanate CX, SU-268A, NBP-8730, NBP-211 (Meisel Chemical Works, Ltd.), Elastron BN-69, BN-44, BN-04, BN-08 (DKS Co. Ltd.), Takenate WB-700, WB-770, WB-920 (Mitsui Chemicals & SKC Polyurethanes Inc.), KarenzMOI-BM, KarenzMOI-BP (Showa Denko K.K.), Duranate MF-K60B, SBN-70D, MF-B60B, MF-B90B, 17B-60P, TPA-B80B, TPA-B80E, E402-B80B (Asahi Kasei Chemicals Corporation), BI-7950, BI-7951, BI-7960, BI-7961, BI-7963, BI-7982, BI-7991, BI-7992 (Baxenden Chemicals Ltd.), IPDI-B1065, IPDI-B1530, IPDI-BF1540 (Huls Co.), Burnock B7-887-60, B3-867, DB980K (DIC Corporation), Desmodur BL1100/1, Sumidur BL3175, Desmodur BL3272MPA, Desmodur BL3475BA/SN, Desmodur BL3575/1MPA/SN (Sumitomo Bayer Urethane Co. Ltd.), and 3-(3,4-dichlorophenyl)-1,1-dimethylurea "DCMU" (Hodogaya Chemical Co., Ltd.).

Examples of tertiary amines include aliphatic amines, aromatic amines, AO adducts of primary amines or secondary amines, nitrogen-containing heterocyclic aliphatic amines, imidazoline ring-containing compounds, and imidazole homologues.

Examples of aliphatic amines include alkyl amines (such as trimethylamine, triethylamine, ethyldimethylamine, triisopropylamine, tributylamine, trioctylamine, diethylisopropylamine, tetramethylethylenediamine, and diisopropylethylamine), and alkanolamines (such as dibutylmonoethanolamine, N-ethyldiethanolamine, triethanolamine, and triisopropanolamine).

Examples of aromatic amines include 2,4,6-tris(dimethylaminomethyl)phenol and 1,8-bis(dimethylamino)naphthalene.

Examples of AO adducts of primary amines or secondary amines include EO (4 mol) adducts of butylamine, EO (10 mol) adducts of butylamine, PO (10 mol) adducts of butylamine, EO (10 mol) adducts of laurylamine, EO (10 mol) adducts of stearylamine, EO (15 mol) adducts of stearylamine, EO (2 mol) adducts of cyclohexylamine, EO (2 mol) adducts of aniline, EO (4 mol) adducts of hexamethylenediamine, EO (4 mol) adducts of diethylamine, PO (10 mol) adducts of diethylamine, EO (4 mol) adducts of dibutylamine, PO (10 mol) adducts of dibutylamine, EO (10 mol) adducts of laurylmethylamine, EO (15 mol) adducts of methylstearylamine, and PO (10 mol) adducts of methylstearylamine.

Examples of nitrogen-containing heterocyclic aliphatic amines include N-methylpyrrolidine, N-ethylpyrrolidine, N-methylpiperidine, N-ethylpiperidine, N-butylpiperidine, N-methylhexamethyleneimine, N-ethylhexamethyleneimine, N-methylmorpholine, N-butylmorpholine, N,N'-dimethylpiperazine, N,N'-diethylpiperazine, 2,6-dimethylpyridine, 1-methyl-1,4,5,6-tetrahydropyrimidine, 1,2-dimethyl-1,4,5,6-tetrahydropyrimidine, 1,5-diazabicyclo[4.3.0]-5-nonene (DBN), 1,8-diazabicyclo[5.4.0]-7-undecene (DBU), pyridine, 4-dimethylaminopyridine, picolines, quinoline, and 2,2'-bipyridyl.

Examples of imidazoline ring-containing compounds include 1,2-dimethylimidazoline, 1,2,4-trimethylimidazoline, 1,2,5-trimethylimidazoline, 1,4-dimethyl-2-ethylimidazoline, 1-methyl-2-ethylimidazoline, 1-methyl-2-heptylimidazoline, 1-methyl-2-(4'-heptyl)imidazoline, and 1-methyl-2-dodecyl imidazoline.

Examples of imidazole homologues include 1-methylimidazole, 1-ethylimidazole, 1-ethyl-2-methylimidazole, 1,2-dimethylimidazole, 1-methyl-2-ethylimidazole, 1,4-dimethylimidazole, 1,5-dimethylimidazole, 1,2,4-trimethylimidazole, and 1,4-dimethyl-2-ethylimidazole.

Preferred among these tertiary amines in view of strength of the resulting composite materials are aliphatic amines, aromatic amines, AO adducts of primary amines or secondary amines, and nitrogen-containing heterocyclic aliphatic amines. More preferred are triisopropylamine, diisopropylethylamine, dibutylethanolamine, diethylethanolamine, triethanolamine, triisopropanolamine, 2,4,6-tris(dimethylaminomethyl)phenol, 1,8-bis(dimethylamino)naphthalene, 2,6-dimethylpyridine, DBU, and DBN.

Examples of tertiary amine salts include inorganic acid (e.g., sulfuric acid, hydrochloric acid, nitric acid, phosphoric acid) salts and organic acid (e.g., carboxylic acid, sulfonic acid, phenol) salts of the above tertiary amines. These salts can be produced by neutralizing any of the above tertiary amines or by reacting a corresponding secondary amine with an alkylating agent (a dialkylsulfuric acid (such as dimethylsulfuric acid) or an alkyl halide (such as methyl chloride)).

Examples of the carboxylic acid include aliphatic carboxylic acids, alicyclic carboxylic acids, and aromatic carboxylic acids.

Examples of aliphatic carboxylic acids include monocarboxylic acids (C1-C30, such as formic acid, acetic acid, octanoic acid, and oleic acid); polycarboxylic acids (dicarboxylic acids (C2-C30, such as oxalic acid, malonic acid, succinic acid, glutaric acid, adipic acid, suberic acid, sebacic acid, fumaric acid, and maleic acid), tricarboxylic acids (C3-C30, such as citric acid), and tetravalent or higher polycarboxylic acids (C4-C30, such as EDTA)).

Examples of alicyclic carboxylic acids include monocarboxylic acids (C4-C30, such as cyclohexane carboxylic acid); and dicarboxylic acids (C5-C30, such as 1,2-cyclohexane dicarboxylic acid).

Examples of aromatic carboxylic acids include monocarboxylic acids (C7-C50, such as benzoic acid); polycarboxylic acids (dicarboxylic acids (C7-C50, such as phthalic acid, terephthalic acid, and isophthalic acid), tricarboxylic acids (C8-C50, such as trimellitic acid), and tetravalent or higher polycarboxylic acids (C9-C50, such as pyromellitic acid)).

Examples of the sulfonic acid include aliphatic sulfonic acids (C1-C20, such as methanesulfonic acid and ethanesulfonic acid) and aromatic sulfonic acids (C6-C50, such as benzenesulfonic acid, toluenesulfonic acid, and naphthalenesulfonic acid).

Examples of the phenols include monocyclic phenols (C6-C30) and polycyclic phenols (C10-C50). These phenols include monophenols and polyphenols. Examples of monocyclic monophenols include phenol, cresol, xylenol, carvacrol, and thymol. Examples of monocyclic polyphenols include catechol, resorcin, hydroquinone, pyrogallol, and phloroglucin. Examples of polycyclic monophenols include naphthol. Examples of polycyclic polyphenols include anthrarobin.

Preferred among tertiary amine salts in view of strength of the resulting composite materials are DBU salts and DBN salts. Specific examples of DBU salts include DBU/phenol salt (such as U-CAT SA1 available from San-Apro Ltd.), DBU/octanoic acid salt (such as U-CAT SA102 available from San-Apro Ltd.), DBU/p-toluenesulfonic acid salt (such as U-CAT SA506 available from San-Apro Ltd.), DBU/formic acid salt (such as U-CAT SA603 available from San-Apro Ltd.), DBU/orthophthalic acid salt (such as U-CAT SA810 available from San-Apro Ltd.), and DBU/phenol novolac resin salt (such as U-CAT SA831, SA841, SA851, and SA881, available from San-Apro Ltd.).

Quaternary ammonium salts include quaternary ammonium groups and anions, and can be produced by reacting any tertiary amine with an alkylating agent (such as dialkylsulfuric acid (e.g., dimethylsulfuric acid) or alkyl halide (e.g., methyl chloride)).

Examples of quaternary ammonium groups include tetraalkyl ammonium compounds (such as tetramethylammonium, ethyltrimethylammonium, and benzyltrimethylammonium), pyrrolidinium compounds (such as N,N-dimethylpyrrolidinium, N-ethyl-N-methylpyrrolidinium, and N,N-diethylpyrrolidinium), piperidinium compounds (such as N,N-dimethylpiperidinium), hexamethyleneiminium compounds (such as N,N-dimethyl hexamethyleneiminium), morpholinium compounds (such as N,N-dimethylmorpholinium), piperazinium compounds (such as N,N,N',N'-tetramethylpiperazinium), tetrahydropyrimidinium compounds (such as 1,3-dimethyl-1,4,5,6-tetrahydropyrimidinium, 1,2,3-trimethyl-1,4,5,6-tetrahydropyrimidinium, 1,2,3,4-tetramethyl-1,4,5,6-tetrahydropyrimidinium, 1,2,3,5-tetramethyl-1,4,5,6-tetrahydropyrimidinium, 8-methyl-1,8-diazabicyclo[5.4.0]-7-undecenium, 5-methyl-1,5-diazabicyclo[4.3.0]-5-nonenium, 8-ethyl-1,8-diazabicyclo[5.4.0]-7-undecenium, and 5-ethyl-1,5-diazabicyclo[4.3.0]-5-nonenium), pyridinium compounds (such as N-methylpyridinium), imidazolinium compounds (such as 1,2,3-trimethylimidazolium, 1-methyl-2,3,4-triethylimidazolinium, and 1,1,2,4,5-pentamethylimidazolinium), imidazolium compounds (such as 1,3-dimethylimidazolium, 1-ethyl-3-methylimidazolium, 1,2,3,4-tetramethylimidazolium, 1,3,4-trimethyl-2-ethylimidazolium, 1,3-dimethyl-2,4-diethylimidazolium, 1,1-dimethyl-2-(4'-heptyl)imidazolium, 1,1-dimethyl-2-dodecylimidazolium, 1,1-dimethylimidazolium, 1,1,2,5-tetramethylimidazolium, and 1,1,2,4,5-pentamethylimidazolium), quinolinium compounds (such as N-methylquinolinium), and bipyridinium compounds (such as N-methyl-2,2'-bipyridinium).

Preferred among these quaternary ammonium groups in view of strength of the resulting composite materials are tetraalkyl ammonium compounds, piperazinium compounds, and tetrahydropyrimidinium compounds. More preferred are tetrahydropyrimidinium compounds.

Examples of anions of quaternary ammonium salts include halogen ions (fluoride anion, chloride anion, bromide anion, and iodide anion), hydroxide anion, carboxylate anions (formate ion, acetate ion, propionate ion, oxalate ion, maleate ion, and benzoate ion), sulfate anion, nitrate anion, nitrite anion, benzenesulfonate anion, toluenesulfonate anion, phosphorus-containing anions (such as phosphate ion, phosphite ion, and hypophosphite ion), carbonate ion, and nitrogen-containing heterocyclic anions (such as benzotriazolate and phthalimide).

Preferred among these anions in view of strength of the resulting composite materials are halogen ions.

Preferred among quaternary ammonium salts in view of strength of the resulting composite materials are tetraalkylammonium halide, piperazinium halide, and tetrahydropyrimidinium halide. More preferred are 5-methyl-1,5-diazabicyclo[4.3.0]-5-nonenium halide and 8-ethyl-1,8-diazabicyclo[5.4.0]-7-undecenium halide.

Quaternary phosphonium salts include quaternary phosphonium groups and anions, and can be synthesized by known techniques disclosed in, for example, JP-A H02-40389, JP-A H03-74395, JP-A 2002-97182, and "Modern Organic Synthesis Series (5) Organophosphorus Compounds" (published by Gihodo Shuppan).

Examples of quaternary phosphonium groups include the following aliphatic phosphonium groups and aromatic phosphonium groups.

Examples of aliphatic phosphonium groups include tetramethylphosphonium, ethyltrimethylphosphonium, triethylmethylphosphonium, tetraethylphosphonium, diethyldimethylphosphonium, trimethyl-n-propylphosphonium, trimethylisopropylphosphonium, di-t-butyldimethylphosphonium, n-butylisobutyldimethylphosphonium, tetrabutylphosphonium, trimethyloctadecylphosphonium, tri-n-octylmethylphosphonium, (2-acetoxyethyl)trimethylphosphonium, (2-methoxyethoxymethyl)triethylphosphonium, and ethyltri-n-octylphosphonium. Examples of aromatic phosphonium groups include tetraphenylphosphonium, triphenylmethylphosphonium, diphenyldimethylphosphonium, ethyltriphenylphosphonium, n-butyltriphenylphosphonium, benzyltriphenylphosphonium, isopropyltriphenylphosphonium, vinyltriphenylphosphonium, allyltriphenylphosphonium, triphenylpropargylphosphonium, t-butyltriphenylphosphonium, and benzyltrimethylphosphonium. Quaternary phosphonium groups may be mixtures of two or more of those mentioned above.

Examples of anions of quaternary phosphonium salts include the same as those of anions of the quaternary ammonium salts. Preferred among these anions are halogen ions.

Examples of quaternary phosphonium salts include tetramethylphosphonium bromide, tetrabutylphosphonium bromide, trimethyloctadecylphosphonium bromide, trimethyloctadecylphosphonium hydroxide, trimethyloctadecylphosphonium acetate, trimethyloctadecylphosphonium p-toluenesulfonate, trimethyloctadecylphosphonium hydrochloride, trimethyloctadecylphosphonium tetrachloroiodate, trimethyloctadecylphosphonium hydrogensulfate, trimethyloctadecylphosphonium methylsulfate, benzyltrimethylphosphonium hydroxide, benzyltrimethylphosphonium acetate, benzyltrimethylphosphonium benzoate, benzyltrimethylphosphonium p-toluenesulfonate, tetraphenylphosphonium bromide, tetraphenylphosphonium hydroxide, (2-methoxyethoxymethyl)triethylphosphonium chloride, and (2-acetoxyethyl)trimethylphosphonium chloride.

Preferred among these in view of strength of the resulting composite materials are tetrabutylphosphonium bromide and tetraphenylphosphonium bromide.

Examples of phosphine compounds include triethylphosphine, tripropylphosphine, tributylphosphine, tri-t-butylphosphine, tripentylphosphine, trihexylphosphine, tricyclopentylphosphine, tricyclohexylphosphine, trioctylphosphine, triphenylphosphine, tri(2-furyl)phosphine, dimethylpropylphosphine, dimethylbutylphosphine, dimethylpentylphosphine, dimethylcyclohexylphosphine, dimethyloctylphosphine, dimethyloctadecylphosphine, dimethyldocosylphosphine, diethylpropylphosphine, ditetradecylmethylphosphine, ditetradecylethylphosphine, ditetradecylpropylphosphine, dibutylpropanolphosphine, diisobutylpropanolphosphine, di-t-butylpropanolphosphine, di(2-ethylhexyl)propanolphosphine, methyldimethanolphosphine, ethyldimethanolphosphine, isopropyldimethanolphosphine, butyldimethanolphosphine, tri-m-tolylphosphine, and tris-2,6-dimethoxyphenylphosphine.

Preferred among these in view of strength of the resulting composite materials are tributylphosphine and triphenylphosphine.

Preferred among the examples of the reactive compound (B) are blocked isocyanates in view of strength of the resulting composite material.

The weight ratio of the polyester resin (A) to the reactive compound (B) [(A)/(B)] is 99.9/0.1 to 10/90. In view of the balance between sizing properties of fiber bundles and strength of the resulting composite materials, the weight ratio [(A)/(B)] is preferably 99.5/0.5 to 20/80, particularly preferably 99/1 to 50/50.

In view of sizing properties of fiber bundles, the amount of the polyester resin (A) is preferably 10 to 99.9% by weight, more preferably 20 to 90% by weight, particularly preferably 30 to 80% by weight, based on the total weight of the fiber sizing agent composition. Likewise, the amount of the reactive compound (B) is preferably 0.1 to 20% by weight, more preferably 0.2 to 10% by weight, particularly preferably 0.5 to 5% by weight, based on the total weight of the fiber sizing agent composition.

The fiber sizing agent composition of the present invention may contain at least one of a resin (C) other than the polyester resin (A), a surfactant (D), and an additional additive (E), in addition to the polyester resin (A) and the reactive compound (B).

The presence of the resin (C) in the fiber sizing agent composition of the present invention improves impregnation of the matrix resin into fiber bundles. Thus, the resulting composite materials have excellent strength. The presence of the surfactant (D) in the fiber sizing agent composition of the present invention facilitates smoothening of the sizing agent attached to inorganic fibers, thus further improving the abrasion resistance of inorganic fiber bundles, and facilitating the production of an aqueous emulsion containing only a small amount of an organic solvent.

Examples of the resin (C) other than the polyester resin (A) include thermoplastic resins such as polyethylene resin, polypropylene resin, polystyrene resin, polyurethane resin, polyamide resin, (meth)acrylic resin, and polyester resin other than the polyester resin (A); and thermosetting resins such as epoxy resin, (meth)acrylate-modified resins, and unsaturated polyester resins. Two or more of these may be used in combination. The term "(meth)acrylate" is meant to encompass acrylates and methacrylates. Unsaturated polyester resins are excluded from the polyester resin (A) and the polyester resin other than the polyester resin (A).

Example of polyurethane resins include those derived from reaction of a polymer polyol, an organic diisocyanate, and, if necessary, a chain extension agent and/or a crosslinking agent.

Examples of the polymer polyols include polyester polyols (such as polyethylene adipate diol, polybutylene adipate diol, polyethylenebutylene adipate diol, polyneopentyl adipate diol, polyneopentyl terephthalate diol, polycaprolactone diol, polyvalerolactone diol, and polyhexamethylene carbonate diol); polyether polyols (such as polyethylene glycol, polypropylene glycol, polyethylenepropylene glycol, polytetramethylene glycol, and C2-C4 AO adducts of bisphenols).

Specific examples of the organic diisocyanate include aromatic diisocyanate such as 2,4'- or 4,4'-diphenylmethane diisocyanate (MDI), 2,4- or 2,6-tolylene diisocyanate (TDI), 4,4'-dibenzyl diisocyanate, 1,3- or 1,4-phenylene diisocyanate, 1,5-naphthylene diisocyanate, and xylylene diisocyanate; aliphatic diisocyanates such as ethylene diisocyanate, hexamethylene diisocyanate (HDI), and lysine diisocyanate; alicyclic diisocyanates such as isophorone diisocyanate (IPDI) and 4,4'-dicyclohexylmethane diisocyanate; and mixtures of two or or more thereof.

An epoxy resin is a resin having at least one glycidyl group in the molecule. Examples thereof include monoepoxide, diepoxide, phenol novolac epoxy resin, and epoxidized unsaturated fatty acid triglycerides (such as epoxidized soybean oil and epoxidized rapeseed oil).

Examples of monoepoxides include condensates (including polycondensates) of C1-C30 monohidric alcohols and epichlorohydrin, having a glycidyl ether group at an end. Examples of C1-C30 monohidric alcohols include methanol, ethanol, butanol, hexanol, cyclohexanol, octanol, dodecyl alcohol, tetradecyl alcohol, stearyl alcohol, icosyl alcohol, behenyl alcohol, tetracosyl alcohol, and triacontyl alcohol.

Examples of diepoxides include diglycidyl ethers, diglycidyl esters, diglycidyl amines, and alicyclic diepoxides.

Examples of diglycidyl ethers include diglycidyl ethers of dihydric phenols and diglycidyl ethers of dihydric alcohols.

Examples of diglycidyl ethers of dihydric phenols include condensates (including polycondensates) of C6-C30 dihydric phenols and epichlorohydrin, having glycidyl ether groups at both ends. Examples of dihydric phenols include bisphenols (such as bisphenol F, bisphenol A, bisphenol B, bisphenol AD, bisphenol S, and halogenated bisphenol A), catechin, resorcinol, hydroquinone, 1 5-dihydroxynaphthalene, dihydroxybiphenyl, octachloro-4,4'-dihydroxybiphenyl, tetramethylbiphenyl, and 9,9'-bis(4-hydroxyphenyl)fluorene.

Examples of diglycidyl ethers of dihydric alcohols include condensates (including polycondensates) of C2-C200 dihydric alcohols and epichlorohydrin, having glycidyl ether groups at both ends. Examples of dihydric alcohols include aliphatic diols such as ethylene glycol, propylene glycol, tetramethylene glycol, 1,6-hexanediol, polyethylene glycol, polypropylene glycol, polytetramethylene ether glycol, and neopentyl glycol, AO adducts (C2-C4) of these aliphatic diols and dihydric phenols, and the above polyurethane resins having two hydroxyl groups at the ends.

The molar ratio of dihydric phenol units or dihydric alcohol units to epichlorohydrin units ((dihydric phenol units or dihydric alcohol units):(epichlorohydrin units)) contained in the diglycidyl ether is expressed by n:n+1. n is preferably 1 to 10, more preferably 1 to 8, particularly preferably 1 to 5. The diglycidyl ether may be a mixture in which n is 1 to 10 (e.g., a mixture of components having different degrees of polycondensation).

Examples of diglycidyl esters include diglycidyl esters of aromatic dicarboxylic acids and diglycidyl esters of aliphatic dicarboxylic acids.

Examples of diglycidyl esters of aromatic dicarboxylic acids include condensates (including polycondensates) of aromatic dicarboxylic acids and epichlorohydrin, having two glycidyl groups.

Examples of diglycidyl esters of aliphatic dicarboxylic acids include condensates (including polycondensates) of aromatic nuclear-hydrogenated aromatic dicarboxylic acids (such as hexahydrophthalic acid and 4-cyclohexen-1,2-dicarboxylic acid) or linear or branched aliphatic dicarboxylic acids (such as adipic acid and 2,2-dimethylpropanedicarboxylic acid) and epichlorohydrin, having two glycidyl groups.

The molar ratio of aromatic dicarboxylic acid units or aliphatic dicarboxylic acid units to epichlorohydrin units ((aromatic dicarboxylic acid units or aliphatic dicarboxylic acid units):(epichlorohydrin units)) contained in the diglycidyl ester is expressed by n:n+1. n is preferably 1 to 10, more preferably 1 to 8, particularly preferably 1 to 5. The diglycidyl ester may be a mixture in which n is 1 to 10.

Examples of diglycidyl amines include N-glycidyl compounds (such as N,N-diglycidylaniline and N,N-diglycidyltoluidine) obtained by reacting C6-C20 aromatic amines having 2 to 4 active hydrogen atoms (such as aniline and toluidine) with epichlorohydrin.

The molar ratio of aromatic amine units to epichlorohydrin units ((aromatic amine units):(epichlorohydrin units)) contained in the diglycidyl amine is expressed by n:n+1. n is preferably 1 to 10, more preferably 1 to 8, particularly preferably 1 to 5. The diglycidyl amine may be a mixture in which n is 1 to 10.

Examples of alicyclic diepoxides include C6-C50 alicyclic epoxides having two epoxy groups (such as vinylcyclohexene dioxide, limonene dioxide, dicyclopentadiene dioxide, bis(2,3-epoxycyclopentyl)ether, ethylene glycol bisepoxydicyclopentyl ether, bis(3,4-epoxy-6-methylcyclohexylmethyl) adipate, and bis(3,4-epoxy-6-methylcyclohexylmethyl)butylamine).

Examples of (meth)acrylate-modified resins include (meth)acrylate-modified thermoplastic resins and vinyl ester resins.

Examples of (meth)acrylate-modified thermoplastic resins include modified products obtained by modifying hydroxyl groups of thermoplastic resins having alcoholic hydroxyl groups (such as polyurethane, polyester, and polyether (polypropylene glycol and polyethylene glycol)) with (meth)acrylic acid. Polyurethane (di-/mono-)(meth)acrylates, polyester (di-/mono-)(meth)acrylates, and polyether (di-/mono-)(meth)acrylates may be exemplified. The term "(di-/mono-)(meth)acrylate" is meant to encompass di(meth)acrylates and mono(meth)acrylates.

Examples of vinyl ester resins include bisphenol epoxy resins modified with a (meth)acrylate (such as resins terminally modified with a (meth)acrylate, obtained by reacting epoxy groups of bisphenol A epoxy resin with carboxyl groups of (meth)acrylic acid).

Examples of unsaturated polyester resins include solutions of unsaturated polyesters obtained by reacting acid components including α,β-unsaturated dicarboxylic acids with alcohol in polymerizable unsaturated monomers. Examples of α,β-unsaturated dicarboxylic acids include maleic acid, fumaric acid, itaconic acid, and derivatives such as anhydrides of these acids. Two or more of these may be used in combination. If necessary, α,β-unsaturated dicarboxylic acids may be used in combination with acid components other than the α,β-unsaturated dicarboxylic acids. Other acid components include saturated dicarboxylic acids such as phthalic acid, isophthalic acid, terephthalic acid, tetrahydrophthalic acid, adipic acid, and sebacic acid, and derivatives such as anhydrides of these acids. Examples of alcohols include aliphatic glycols such as ethylene glycol, diethylene glycol, propylene glycol, dipropylene glycol, 1,2-propanediol, 1,2-butanediol, 1,3-butanediol, and 1,4-butanediol; alicyclic diols such as cyclopentanediol and cyclohexanediol; aromatic diols such as hydrogenated bisphenol A, propylene oxide (1-100 mol) adducts of bisphenol A, and xylene glycols; and polyhydric alcohols such as trimethylolpropane and pentaerythritol. Two or more of these may be used in combination.

Specific examples thereof include a condensate of fumaric acid or maleic acid and an ethylene oxide adduct of bisphenol A, a condensate of fumaric acid or maleic acid and a propylene oxide adduct of bisphenol A, and a condensate of fumaric acid or maleic acid and an ethylene oxide propylene oxide adduct (which may be added in a random or block form) of bisphenol A. If necessary, these condensates may be in the form of solution in monomers such as styrene.

Examples of polyester resins other than the polyester resin (A) include polyester resins obtained by reacting the dicarboxylic acid (a1) and/or the dicarboxylic anhydride (a2) with any of the diols (b), lactone ring-opening polymers, and polyhydroxycarboxylic acids (in any of these, the HLB is not in the range of 4 to 18 or the viscosity at 30° C. is not in the range of 10 to 1,000,000 Pa·s).

Examples of lactone ring-opening polymers include those obtained by ring-opening polymerization of lactones such as C3-C12 mono-lactones (having one ester group in the ring) (such as β-propiolactone, γ-butyrolactone, δ-valerolactone, and ε-caprolactone) using catalysts such as a metal oxide and an organometallic compound.

Examples of polyhydroxycarboxylic acids include those obtained by dehydration condensation of hydroxy carboxylic acids (such as glycolic acid and lactic acid).

Preferred among the examples of the resin (C) in view of properties such as strength of the resulting composite materials are epoxy resins, polyurethane resins, (meth)acrylic resins, unsaturated polyester resins, polyamide resins, and the polyester resins other than the polyester resin (A). More preferred are epoxy resins, polyurethane resins, (meth)acrylic resins, and unsaturated polyester resins. Particularly preferred are epoxy resins.

In view of impregnation of the matrix resin, the amount of the resin (C), if used, is preferably 1 to 90% by weight, more preferably 5 to 80% by weight, still more preferably 10 to 75% by weight, particularly preferably 10 to 50% by weight, based on the total weight of the fiber sizing agent composition.

Examples of the surfactant (D) include surfactants such as nonionic surfactants, anionic surfactants, cationic surfactants, and amphoteric surfactants. Two or more of these may be used in combination.

Examples of nonionic surfactants include alkylene oxide-addition type nonionic surfactants (such as AO adducts of higher alcohols (C8-C18) or higher fatty acids (C12-C24); AO adducts of alkylphenols (C10-C20), styrenated phenol (C14-C62), styrenated cumylphenol, or styrenated cresol (C15-61); reaction products of polyalkylene glycols with higher fatty acids; AO adducts of esterified products obtained by reacting polyhydric (dihydric to octahydric or higher polyhydric) alcohols (C2-C32, such as ethylene glycol, propylene glycol, glycerin, pentaerythritol, and sorbitan) with higher fatty acids (C12-C24, such as lauric acid and stearic acid); alkylene oxide adducts of higher fatty acid amides; and AO adducts of polyhydric (dihydric to octahydric or higher polyhydric) alcohol alkyl (C8-C60) ethers), and polyhydric (dihydric to octahydric or higher polyhydric) alcohol (C2-C32) type nonionic surfactants (such as polyhydric alcohol fatty acid (C8-C36) esters, polyhydric alcohol alkyl (C7-C32) ethers, and fatty acid (C8-C32) alkanolamides)).

Examples of anionic surfactants include carboxylic acids (C8-C22 saturated or unsaturated fatty acids) or salts thereof (such as sodium salt, potassium salt, ammonium salt, and alkanolamine salt), salts of carboxymethylated products of C8-C16 aliphatic alcohols, C8-C24 aliphatic alcohol ether carboxylic acids (such as carboxymethylated products of AO (1-10 mol) adducts of C8-C24 (preferably C10-C18) aliphatic alcohols), sulfate ester salts (sulfates of higher alcohols (such as sulfates of C8-C18 aliphatic alcohols)), higher alkyl ether sulfate ester salts (such as sulfates of EO (1-10 mol) adducts of C8-C18 aliphatic alcohols), sulfonated oil (obtained by sulfonating and neutralizing natural unsaturated oil and fat or unsaturated wax without modification), sulfonated fatty acid esters (obtained by sulfonating and neutralizing lower alcohol esters of unsaturated fatty acids), sulfonated olefins (obtained by sulfonating and neutralizing C12-C18 olefins), sulfonates (such as alkylbenzene sulfonate, alkyl naphthalene sulfonate, diester sulfosuccinate, α-olefin (C12-C18) sulfonate, and Igepon T type), phosphate ester salts (such as phosphates of higher alcohols (C8-C60), phosphate of EO adducts of higher alcohols (C8-C60), and phosphates of ethylene oxide adducts of alkyl (C8-C60) phenols), sulfates of AO adducts of alkylphenols (C10-C20) (such as sodium salt, potassium salt, ammonium salt, and alkanolamine salt), and sulfates of AO adducts of arylalkylphenols (such as styrenated phenol (C14-C62), styrenated cumylphenol, and styrenated cresol (C15-C61)).

Examples of cationic surfactants include quaternary ammonium salt (such as stearyltrimethylammonium chloride, behenyltrimethylammonium chloride, distearyldimethylammonium chloride, and lanolin fatty acid aminopropyl ethyl dimethyl ammonium ethyl sulfate), and amine salt (such as stearic acid diethylaminoethylamide lactate, dilaurylamine hydrochloride, and oleylamine lactate).

Examples of amphoteric surfactants include betaine amphoteric surfactants (such as coconut oil fatty acid amidopropyl dimethyl betaine, lauryl dimethyl betaine, 2-alkyl-N-carboxymethyl-N-hydroxyethyl imidazolinium betaine, lauryl hydroxy sulfobetaine, and sodium lauroyl amidoethyl hydroxyethyl carboxymethyl betaine hydroxypropyl phosphate), and amino acid amphoteric surfactants (such as sodium β-laurylaminopropionate).

Preferred among the examples of the surfactant (D) are anionic surfactants, nonionic surfactants, and mixtures of any of anionic surfactants and nonionic surfactants. More preferred are AO adducts of alkylphenols, AO adducts of arylalkylphenols (such as styrenated phenol, styrenated cumylphenol, and styrenated cresol), sulfates of AO adducts of alkylphenols, sulfates of AO adducts of arylalkylphenols, and mixtures thereof. Particularly preferred are AO adducts of arylalkylphenols, sulfates of AO adducts of arylalkylphenols, and mixtures thereof.

In view of sizing properties of fiber bundles, the amount of the surfactant (D), if used, is preferably 0.5 to 20% by weight, more preferably 1 to 15% by weight, particularly preferably 2 to 10% by weight, based on the total weight of the fiber sizing agent composition.

Examples of the additional additive (E) include at least one selected from the group consisting of smoothening agents, antiseptic agents, and antioxidants.

Examples of smoothening agents include waxes (such as polyethylene, polypropylene, oxidized polyethylene, oxidized polypropylene, modified polyethylene, and modified polypropylene), higher fatty acid alkyl (C1-C24) esters (such as methyl stearate, ethyl stearate, propyl stearate, butyl stearate, octyl stearate, and stearyl stearate), and higher fatty acids (such as myristic acid, palmitic acid, and stearic acid).

Examples of antiseptic agents include benzoic acids, salicylic acids, sorbic acids, quaternary ammonium salts, and imidazoles.

Examples of antioxidants include phenols (such as 2,6-di-t-butyl-p-cresol), thiodipropionates (such as dilauryl 3,3'-thiodipropionate), and phosphites (such as triphenyl phosphite).

The amount of the additive (E), if used, is 10% by weight or less, preferably 5% by weight or less, based on the total weight of the fiber sizing agent composition.

Any method may be used to produce the fiber sizing agent composition of the present invention. For example, the fiber sizing agent composition may be produced by a method in which the polyester resin (A), the reactive compound (B), and, if necessary, the resin (C), the surfactant (D), and the additional additive (E) are fed into a mixing vessel in any order, and these components are stirred until the mixture becomes homogeneous preferably at 20° C. to 90° C., more preferably 40° C. to 80° C.

The fiber sizing agent dispersion of the present invention is preferably a dispersion of the fiber sizing agent composition of the present invention in a solvent.

The fiber sizing agent solution of the present invention is preferably a solution of the fiber sizing agent of the present invention in a solvent.

The fiber sizing agent composition in the form of solution or dispersion in a solvent facilitates to suitably control the amount of the fiber sizing agent composition to be attached to fiber bundles.

A known solvent may be used. Examples thereof include water and organic solvents such as hydrophilic organic solvents (C1-C4 lower alcohols (such as methanol, ethanol, and isopropanol), C3-C6 ketones (such as acetone, ethyl methyl ketone, and methyl isobutyl ketone), C2-C6 glycols (such as ethylene glycol, propylene glycol, diethylene glycol, and triethylene glycol), and monoalkyl (C1-C2) ethers thereof; dimethylformamide; and C3-C5 alkyl acetates (such as methyl acetate and ethyl acetate)). Two or more of these may be used in combination. Preferred among these solvents in view of factors such as safety are water and mixed solvents of a hydrophilic organic solvent and water. Water is more preferred.

Preferably, the fiber sizing agent dispersion and the fiber sizing agent solution of the present invention are of high concentration during the distribution and are of low concentration during the production of fiber bundles, in view of factors such as cost. Specifically, it is possible to reduce the transport cost, storage cost, and the like, owing to the high concentration during the distribution. Meanwhile, it is possible to produce fiber bundles with a good balance of excellent sizing properties and excellent fiber spreading properties, owing to treatment of fibers at a low concentration.

When the fiber sizing agent dispersion and the fiber sizing agent solution are of high concentration, the concentration (the percentage of components other than the solvent) is preferably 30 to 80% by weight, more preferably 40 to 70% by weight, in view of factors such as storage stability.

When the fiber sizing agent dispersion and the fiber sizing agent solution are of low concentration, the concentration is preferably 0.5 to 15% by weight, more preferably 1 to 10% by weight, for suitably controlling the amount of the fiber sizing agent composition to be attached during the production of fiber bundles.

Any method may be used to produce the fiber sizing agent dispersion and the fiber sizing agent solution of the present invention. For example, in one method, a solvent is fed into the fiber sizing agent composition of the present invention obtained by the above method, and the fiber sizing agent composition is dissolved or emulsion-dispersed in the solvent.

The temperature at which the fiber sizing agent composition is dissolved or emulsion-dispersed in the solvent is preferably 20° C. to 90° C., more preferably 40° C. to 90° C., in view of easy mixing.

The time in which the fiber sizing agent composition is dissolved or emulsion-dispersed in the solvent is preferably 1 to 20 hours, more preferably 2 to 10 hours.

When the fiber sizing agent composition is dissolved or emulsion-dispersed in an aqueous solvent, any known mixer, dissolver, or emulsion-disperser can be used. Specific examples include a stirring blade (blade shape: oar-type, three-stage paddle, etc.), a Nauta mixer (Hosokawa Micron Corporation), a ribbon mixer, a conical blender, a mortar mixer, a universal mixer (such as a universal mixer and stirrer "5DM-L" (San-Eisha. Ltd.)), a Henschel mixer (Nippon Coke & Engineering Company, Limited), and an autoclave.

Examples of fibers to which the fiber sizing agent composition, the fiber sizing agent dispersion, or the fiber sizing agent solution of the present invention is applicable include inorganic fibers such as glass fibers, carbon fibers, ceramic fibers, metal fibers, mineral fibers, and slug fibers (for example, those described in WO 2003/47830), and organic fibers such as aramid fibers. Carbon fibers are preferred in view of strength of a molded article. Two or more of these fibers may be used in combination.

The method for producing fiber bundles of the present invention includes treating at least one type of fibers selected from the group consisting of carbon fibers, glass fibers, aramid fibers, ceramic fibers, metal fibers, mineral fibers, and slug fibers with the above fiber sizing agent composition, fiber sizing agent dispersion, or fiber sizing agent solution to obtain fiber bundles. Preferably, the resulting fiber bundles are each a bundle of about 3,000 to 30,000 fibers.

Fibers can be treated by a method such as a spray method or an immersion method. The amount of the fiber sizing agent composition to be attached to fibers is preferably 0.05 to 5% by weight, more preferably 0.2 to 2.5% by weight, based on the weight of the fibers. Fibers to which the fiber sizing agent composition is attached in the above range have excellent sizing properties.

The composite intermediate of the present invention is made of fiber bundles treated with the fiber sizing agent composition, fiber sizing agent dispersion, or fiber sizing agent solution of the present invention, and a matrix resin. The composite intermediate of the present invention may contain a catalyst, if necessary. The presence of a catalyst in the composite intermediate of the present invention results in a composite material having an excellent tensile strength.

Examples of matrix resins include thermoplastic resins such as polypropylene, polyamide, polyethyleneterephthalate, polycarbonate, and polyphenylene sulfide, and thermosetting resins such as epoxy resin, unsaturated polyester resin, vinyl ester resin, and phenolic resin.

Examples of catalysts for epoxy resins include known curing agents and curing accelerators for epoxy resins (such as those disclosed in JP-A 2005-213337). Examples of catalysts for unsaturated polyester resins and vinyl ester resins include peroxides (such as benzoyl peroxide, t-butyl perbenzoate, t-butylcumyl peroxide, methyl ethyl ketone peroxide, 1,1-di(t-butylperoxy)butane, di(4-t-butylcyclohexyl)peroxydicarbonate), and azo compounds (such as azobisisovaleronitrile).

In the composite intermediate of the present invention, the weight ratio of the matrix resin to the fiber bundles (matrix resin/fiber bundles) is preferably 10/90 to 90/10, more preferably 20/80 to 70/30, particularly preferably 30/70 to 60/40, in view of factors such as strength of a molded article. The amount of a catalyst, if contained in the composite intermediate, is preferably 0.01 to 10% by weight, more preferably 0.1 to 5% by weight, particularly preferably 1 to 3% by weight, relative to the amount of the matrix resin, in view of factors such as strength of a molded article.

The composite intermediate can be produced by impregnating the fiber bundles with a thermally melted (melting temperature: 60° C. to 150° C.) matrix resin or a matrix resin diluted with a solvent (such as acetone, methyl ethyl ketone, methyl isobutyl ketone, toluene, xylene, or ethyl acetate). The solvent, if used, is preferably removed by drying a prepreg.

The fiber-reinforced composite material of the present invention can be obtained by molding the composite intermediate. When the matrix resin is a thermoplastic resin, a prepreg may be heat-molded and solidified at room temperature to form a molded article. When the matrix resin is a thermosetting resin, a prepreg may be heat-molded and cured to form a molded article. Although it is not necessary to complete the curing, the molded article is preferably cured to an extent that its shape can be maintained. The molded article may be further heated to be completely cured. The heat-molding method is not particularly limited. Examples thereof include a filament winding molding method (a heat-molding method that includes coiling filaments around a rotating mandrel while applying a tension thereto), a press molding method (a heat-molding method that includes laminating prepreg sheets), an autoclaving method (a heat-molding method that includes applying a pressure to push a prepreg sheet into a mold), and a method of mixing chopped fibers or milled fibers with a matrix resin and injection-molding the mixture.

EXAMPLES

The present invention is further described below with reference to production examples and examples, but the present invention is not limited thereto.

Production Example 1: Production of EO (30 Mol) Adduct of Bisphenol A

A pressure-resistant reaction vessel equipped with a stirrer, a heating and cooling device, and a pressure-resistant dropping funnel was charged with 228 parts by weight (1 part by mole) of bisphenol A, 400 parts by weight of toluene, and 2 parts by weight of potassium hydroxide. The reaction vessel was purged with nitrogen. The temperature was increased to 100° C., and 1320 parts by weight (30 parts by mole) of EO was added dropwise to the reaction vessel over 6 hours while the pressure was controlled to 0.5 MPaG or lower. Subsequently, the resulting product was aged at 120° C. for 3 hours, and the toluene was removed at −0.1 MPa. Then, the temperature was decreased to 100° C., and 30 parts by weight of an adsorbent "Kyowaad 600" (Kyowa Chemical Industry Co., Ltd.) was fed into the reaction vessel. After stirring at 100° C. for 1 hour, the adsorbent was filtered, whereby an EO (30 mol) adduct of bisphenol A was obtained.

Production Example 2: Production of EO (3 Mol) Adduct of Bisphenol A

The procedure of Production Example 1 was repeated, except that the amount of EO was changed from 1320 parts by weight (30 parts by mole) to 132 parts by weight (3 parts by mole). Thus, 360 parts by weight of an EO (3 mol) adduct of bisphenol A was obtained.

Production Example 3: Production of Polyester Resin (A-1)

In a glass reaction vessel, 316 parts by weight (1 part by mole) of an EO (2 mol) adduct of bisphenol A "Newpol BPE-20" (Sanyo Chemical Industries, Ltd.), 142 parts by weight (0.86 parts by mole) of terephtalic acid (a11), and 3 parts by weight of potassium titanium oxalate were reacted for 15 hours while water was removed by distillation under a reduced pressure of 0.001 MPa at 230° C. To the reaction mixture was further added 263 parts by weight (0.26 parts by mole) of polyethylene glycol (b11) "PEG-1000" (Sanyo Chemical Industries, Ltd.), followed by reaction at 150° C. under normal pressure for 2 hours. Thus, 690 parts by weight of a polyester resin (A-1) was obtained.

Production Example 4: Production of Polyester Resin (A-2)

The procedure of Production Example 3 was repeated, except that the amount of the terephthalic acid (a11) was changed from 142 parts by weight (0.86 parts by mole) to 163 parts by weight (0.98 parts by mole), and 263 parts by weight (0.26 parts by mole) of the polyethylene glycol (b11) "PEG-1000" (Sanyo Chemical Industries, Ltd.) was changed to 359 parts by weight (0.04 parts by mole) of polyethylene glycol "PEG-10000" (Sanyo Chemical Industries, Ltd.). Thus, 803 parts by weight of a polyester resin (A-2) was obtained.

Production Example 5: Production of Polyester Resin (A-3)

In a glass reaction vessel, 492 parts by weight (1 part by mole) of an EO (6 mol) adduct of bisphenol A "Newpol BPE-60" (Sanyo Chemical Industries, Ltd.), 108 parts by weight (0.93 parts by mole) of fumaric acid (a12), and 3 parts by weight of potassium titanium oxalate were reacted for 15 hours while water was removed by distillation under a reduced pressure of 0.001 MPa at 230° C. To the reaction mixture was further added 480 parts by weight (0.24 parts by mole) of polyethylene glycol (b12) "PEG-2000" (Sanyo Chemical Industries, Ltd.), followed by reaction at 150° C. under normal pressure for 2 hours. Thus, 1046 parts by weight of a polyester resin (A-3) was obtained.

Production Example 6: Production of Polyester Resin (A-4)

In a glass reaction vessel, 402 parts by weight (1 part by mole) of a PO (3 mol) adduct of bisphenol A "Newpol BP-3P" (Sanyo Chemical Industries, Ltd.), 156 parts by weight (0.94 parts by mole) of the terephthalic acid (a11), and 3 parts by weight of potassium titanium oxalate were reacted for 15 hours while water was removed by distillation under a reduced pressure of 0.001 MPa at 230° C. To the reaction mixture was further added 222 parts by weight (0.14 parts by mole) of the EO (30 mol) adduct of bisphenol A (b13) obtained in Production Example 1, followed by reaction at 150° C. under normal pressure for 2 hours. Thus, 745 parts by weight of a polyester resin (A-4) was obtained.

Production Example 7: Production of Polyester Resin (A-5)

In a glass reaction vessel, 316 parts by weight (1 part by mole) of an EO (2 mol) adduct of bisphenol A "Newpol BPE-20" (Sanyo Chemical Industries, Ltd.), 163 parts by weight (0.98 parts by mole) of the terephthalic acid (a11), and 3 parts by weight of potassium titanium oxalate were reacted for 15 hours while water was removed by distillation under a reduced pressure of 0.001 MPa at 230° C. To the reaction mixture was further added 359 parts by weight (0.02 parts by mole) of an EO adduct of polypropylene glycol (b14) "Newpol PE-108" (Sanyo Chemical Industries, Ltd.), followed by reaction at 150° C. under normal pressure for 2 hours. Thus, 800 parts by weight of a polyester resin (A-5) was obtained.

Production Example 8: Production of Polyester Resin (A'-2)

In a glass reaction vessel, 360 parts by weight (1 part by mole) of the EO (3 mol) adduct of bisphenol A obtained in Production Example 2, 64 parts by weight (0.56 parts by mole) of the fumaric acid (a12), and 3 parts by weight of potassium titanium oxalate were reacted for 15 hours while water was removed by distillation under a reduced pressure of 0.001 MPa at 230° C. Thus, 404 parts by weight of a polyester resin (A'-2) was obtained.

Production Example 9: Production of Polyester Resin (A'-4)

In a glass reaction vessel, 8300 parts by weight (1 part by mole) of polyethylene glycol (b15) "PEG-6000S" (Sanyo Chemical Industries, Ltd.), 166 parts by weight (1 part by mole) of the terephthalic acid (a11), and 3 parts by weight of potassium titanium oxalate were reacted for 15 hours while water was removed by distillation under a reduced pressure of 0.001 MPa at 230° C. Thus, 8430 parts by weight of a polyester resin (A'-4) was obtained.

Production Example 10: Production of Blocked Isocyanate (B-1)

A pressure-resistant reaction vessel equipped with a stirrer, a heating and cooling device, and a pressure-resistant dropping funnel was charged with 174 parts by weight (1 part by mole) of TDI and 400 parts by weight of toluene. The reaction vessel was purged with nitrogen and then sealed. Subsequently, 90 parts by weight (2 parts by mole) of dimethylamine was added dropwise to the reaction vessel under stirring while the temperature was controlled to 30° C. or lower. After the completion of dropwise addition, stirring was continued for 1 hour in the temperature range from 30° C. to 40° C., and the toluene was removed by filtration, followed by drying at room temperature. Thus, a blocked isocyanate (B-1) was obtained.

Production Example 11: Production of Blocked Isocyanate (B-2)

A flask equipped with a stirrer and a dropping funnel was charged with 250 parts by weight (1 part by mole) of MDI and 424 parts by weight of tetrahydrofuran. In a nitrogen atmosphere, 174 parts by weight (2 parts by mole) of methyl ethyl ketone oxime was added dropwise to the reaction vessel at 30° C. or lower. After the completion of dropwise addition, the mixture was stirred for 3 hours at 40° C. Thus, a blocked isocyanate (B-2) was obtained.

Table 1 shows properties of each polyester resin in terms of HLB, viscosity at 30° C., ester group concentration, types of the diols (b), and average number of oxyethylene groups per diol. The components and the method for measuring the viscosity shown in Table 1 are described below.

Polyester Resin (A)
(A'-1): Dilauric acid polyethylene glycol "Ionet DL-200" (Sanyo Chemical Industries, Ltd.)
(A'-3): Polylactic acid "RESOMER R202S" (Sigma-Aldrich Co. LLC.)
<Method for Measuring the Viscosity>
The complex viscosity is measured using a viscoelasticity measuring device ("MCR 302" available from Anton Paar Japan K.K.) under the following conditions to read the viscosity at 30° C.
Sample fixing jig: Disk with a diameter of 25 mm
Gap distance: 0.25 mm
Strain: 1%
Frequency: 1 Hz
Measurement temperature: 20° C. to 100° C. (rate of temperature increase: 5° C./min)

(B-6): Amine-blocked HDI "Desmodur BL 3575/1 MPA/SN" (Sumitomo Bayer Urethane Co. Ltd.) (concentration: 75%)
(B-7): 3-(3,4-Dichlorophenyl)-1,1-dimethylurea "DCMU" (Hodogaya Chemical Co., Ltd.)
(B-8): Triethanolamine (Tokyo Chemical Industry Co., Ltd.)
(B-9): DBU-octanoic acid salt "U-CAT SA102" (San-Apro Ltd.)
(B-10): Benzyltrimethylammonium bromide (Tokyo Chemical Industry Co., Ltd.)
(B-11): Tetrabutylphosphonium bromide (Tokyo Chemical Industry Co., Ltd.)
(B-12): Triphenylphosphine (Tokyo Chemical Industry Co., Ltd.)
Resin (C)
(C-1): Diglycidyl ether of bisphenol A "JER834" (Mitsubishi Chemical Corporation)
(C-2): Diglycidyl ether of phenol novolac "JER152" (Mitsubishi Chemical Corporation)
(C-3): N,N,N',N'-tetraglycidyl-4,4'-diaminodiphenylmethane "Araldite MY721" (Huntsman Advanced Materials)
(C-4): Diglycidyl ether of polyoxyalkylene "Denacol EX-946L" (Nagase ChemteX Corporation)
(C-5): Urethane-modified epoxy "Adeka Resin EPU-6" (Adeka Corporation)
(C-6): Alkyl monoglycidyl ether "Epolite M-1230" (Kyoeisha Chemical Co., Ltd.)

TABLE 1

| | HLB | Viscosity at 30° C. (Pa · s) | Ester group concentration (mmol/g) | Type of the diol (b) | Average number of oxyethylene groups per diol |
|---|---|---|---|---|---|
| (A-1) | 10.2 | 100 | 2.48 | EO (2 mol) adduct of bisphenol A | 1 |
| | | | | Polyethylene glycol (b11) | 22 |
| (A-2) | 11.1 | 800,000 | 2.44 | EO (2 mol) adduct of bisphenol A | 1 |
| | | | | Polyethylene glycol | 266 |
| (A-3) | 14.1 | 15,000 | 1.78 | EO (6 mol) adduct of bisphenol A | 3 |
| | | | | Polyethylene glycol (b12) | 45 |
| (A-4) | 5.1 | 2,000 | 2.52 | PO (3 mol) adduct of bisphenol A | 0 |
| | | | | EO (30 mol) adduct of bisphenol A (b13) | 15 |
| (A-5) | 9.3 | 5,000 | 2.44 | EO (2 mol) adduct of bisphenol A | 1 |
| | | | | EO adduct of polypropylene glycol (b14) | 145 |
| (A'-1) | 6.6 | 1 | 3.55 | Polyethylene glycol | 4 |
| (A'-2) | 6.5 | Too high to measure | 2.75 | EO (3 mol) adduct of bisphenol A | 1.5 |
| (A'-3) | 0 | | 13.6 | — | — |
| (A'-4) | 19.8 | | 0.0002 | Polyethylene glycol (b15) | 188 |

Fiber sizing agent compositions containing the components in amounts by parts (in terms of active components) shown in Table 2 and Table 3 were prepared. The fiber sizing agent compositions were each mixed with water to prepare aqueous dispersions of these fiber sizing agent compositions having a solid concentration of 1.5% by weight (Examples 1 to 20 and Comparative Examples 1 to 8). These dispersions were evaluated for emulsion stability, sizing properties and fluffing of carbon fiber bundles, and tensile strength of the resulting composite materials. The components used in the Examples and the Comparative Examples are described below.

Reactive Compound (B)
(B-3): ε-Caprolactam-blocked TDI "Desmodur BL 1100/1" (Sumitomo Bayer Urethane Co. Ltd.)
(B-4): Methyl ethyl ketone oxime-blocked HDI "Sumidur BL 3175" (Sumitomo Bayer Urethane Co. Ltd.) (concentration: 75%)
(B-5): Active methylene-blocked HDI "Desmodur BL 3475 BA/SN" (Sumitomo Bayer Urethane Co. Ltd.) (concentration: 75%)

(C-7): Butadiene-nitrile rubber-modified epoxy "Epiclon TSR-601" (DIC Corporation)
Surfactant (D)
(D-1): Propylene oxide-ethylene oxide adduct of styrenated phenol "Soprophor 796/P" (Solvay Nicca, Ltd.)
<Evaluation of Emulsion Stability>
A sizing agent dilution was prepared by adding 190 g of water to 10 g of the fiber sizing agent composition at 40° C. under stirring. The sizing agent dilution was temperature-controlled to 40° C., and sheared in a homomixer (T.K. Robomix available from Tokushu Kika Kogyo Co., Ltd.) at 8,000 rpm for 10 minutes. The resulting product was filtered through a 400-mesh wire screen (about 10 cm×10 cm; weight: about 5 g), and the increment in weight (g) after filtration through the wire screen was measured. A lower increment in weight means better emulsion stability.
<Evaluation of Sizing Properties>
Untreated carbon fibers (fineness: 800 tex; number of filaments: 12,000) were immersed in and impregnated with the fiber sizing agent composition aqueous dispersions having a solid concentration of 1.5% by weight (Examples 1 to 20 and Comparative Examples 1 to 8), followed by drying with hot air at 120° C. for 3 minutes. Thus, carbon fiber bundles were produced.

The sizing properties of the obtained carbon fiber bundles were evaluated in accordance with JIS L1096-1999 8.19.1, Method A (45° cantilever method). A higher value means better sizing properties.

<Fluffing Measurement>

Five chromium-plated stainless steel bars each having a diameter of 2 mm were placed in a zigzag pattern with 15 mm intervals in such a manner that the carbon fiber bundles would pass around the surface of each stainless steel bar at a contact angle of 120°. The carbon fiber bundles were hung between the stainless steel bars in a zigzag pattern, and a tension of 1 kgf was applied to the carbon fiber bundles. The carbon fiber bundles were sandwiched between two 10 cm×10 cm sheets of urethane foam under a load of 1 kgf at a position immediately before a take-up roll, and were abraded at a rate of 1 m/min for 5 minutes. The weight of fluff attached to the sheets of urethane foam during abrasion was measured. A lower value means increased suppression of fluffing of the fiber bundles, i.e., better fluffing properties.

<Tensile Strength Measurement>

A hot-melt sheet was produced by thinly and uniformly applying a matrix resin (a mixture of 100 parts by weight of bisphenol A epoxy resin "JER828" (Japan Epoxy Resin Co., Ltd.) and 3 parts by weight of $BF_3$ monoethylamine salt) to release paper. Sizing-treated carbon fiber bundles were aligned in parallel on the matrix resin to be impregnated with the matrix resin. Thus, a prepreg containing about 35% by mass of the matrix resin and having an areal fiber weight of 195 g/m² was produced.

Layers of the obtained prepreg in which the carbon fiber bundles were aligned in one direction were laminated and thermally cured under pressure in an autoclave (the temperature was increased from room temperature to 180° C. at a rate of temperature increase of 1.5° C./min under a pressure of 0.59 MPa, and the temperature was maintained for 2 hours). Thus, a cured plate (carbon fiber-reinforced composite material) having a thickness of 1 mm was produced. Subsequently, a test piece having a length of 230 mm and a width of 12.5 mm was cut out from the obtained cured plate, and the test piece was tested for 0° tensile strength in accordance with JIS K7073.

The tensile speed of the tensile tester was set to 1.3 mm/min, and the number of measurements was set to 5 (n=5). The measured values were averaged to determine the tensile strength for each example.

TABLE 2

|  |  |  | Examples |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
| Fiber sizing agent composition (weight %) | Polyester resin (A) | (A-1) | 44 | 44 | 44 | 44 | 44 | 44 | 44 | 44 | 44 | 44 |
|  |  | (A-2) | — | — | — | — | — | — | — | — | — | — |
|  |  | (A-3) | — | — | — | — | — | — | — | — | — | — |
|  |  | (A-4) | — | — | — | — | — | — | — | — | — | — |
|  |  | (A-5) | — | — | — | — | — | — | — | — | — | — |
|  |  | (A'-1) | — | — | — | — | — | — | — | — | — | — |
|  |  | (A'-2) | — | — | — | — | — | — | — | — | — | — |
|  |  | (A'-3) | — | — | — | — | — | — | — | — | — | — |
|  |  | (A'-4) | — | — | — | — | — | — | — | — | — | — |
|  | Reactive compound (B) | (B-1) | 1 | — | — | — | — | — | — | — | — | — |
|  |  | (B-2) | — | 1 | — | — | — | — | — | — | — | — |
|  |  | (B-3) | — | — | 1 | — | — | — | — | — | — | — |
|  |  | (B-4) | — | — | — | 1 | — | — | — | — | — | — |
|  |  | (B-5) | — | — | — | — | 1 | — | — | — | — | — |
|  |  | (B-6) | — | — | — | — | — | 1 | — | — | — | — |
|  |  | (B-7) | — | — | — | — | — | — | 1 | — | — | — |
|  |  | (B-8) | — | — | — | — | — | — | — | 3 | — | — |
|  |  | (B-9) | — | — | — | — | — | — | — | — | 3 | — |
|  |  | (B-10) | — | — | — | — | — | — | — | — | — | 3 |
|  |  | (B-11) | — | — | — | — | — | — | — | — | — | — |
|  |  | (B-12) | — | — | — | — | — | — | — | — | — | — |
|  | Resin (C) | (C-1) | 45 | 45 | 45 | 45 | 45 | 45 | 45 | 43 | — | — |
|  |  | (C-2) | — | — | — | — | — | — | — | — | 43 | — |
|  |  | (C-3) | — | — | — | — | — | — | — | — | — | 43 |
|  |  | (C-4) | — | — | — | — | — | — | — | — | — | — |
|  |  | (C-5) | — | — | — | — | — | — | — | — | — | — |
|  |  | (C-6) | — | — | — | — | — | — | — | — | — | — |
|  |  | (C-7) | — | — | — | — | — | — | — | — | — | — |
|  | Surfactant (D) | (D-1) | 10 | 10 | 10 | 10 | 10 | 10 | 10 | 10 | 10 | 10 |
| Weight ratio (A)/(B) |  | (A) | 97.8 | 97.8 | 97.8 | 97.8 | 97.8 | 97.8 | 97.8 | 93.6 | 93.6 | 93.6 |
|  |  | (B) | 2.2 | 2.2 | 2.2 | 2.2 | 2.2 | 2.2 | 2.2 | 6.4 | 6.4 | 6.4 |
| Emulsion stability (g) |  |  | 0 | 0 | 0 | 0 | 0 | 0 | 0 | 0 | 0 | 0 |
| Sizing properties (cm) |  |  | 14.3 | 16.1 | 15.2 | 13.9 | 14.0 | 16.0 | 13.6 | 17.5 | 16.0 | 16.5 |
| Fluffing (mg) |  |  | 1.9 | 2.8 | 3.3 | 4.2 | 5.1 | 2.9 | 3.8 | 4.9 | 5.3 | 4.8 |
| Tensile strength (MPa) |  |  | 3177 | 2998 | 2864 | 2873 | 2769 | 3098 | 3001 | 2705 | 2699 | 2679 |

TABLE 2-continued

|  |  |  | Examples |  |  |  |  |  |  |  |  |  |
|---|---|---|---|---|---|---|---|---|---|---|---|---|
|  |  |  | 11 | 12 | 13 | 14 | 15 | 16 | 17 | 18 | 19 | 20 |
| Fiber sizing agent composition (weight %) | Polyester resin (A) | (A-1) | 44 | 44 | — | — | — | — | 5 | 3 | 44.9 | 78 |
|  |  | (A-2) | — | — | 44 | — | — | — | — | — | — | — |
|  |  | (A-3) | — | — | — | 44 | — | — | — | — | — | — |
|  |  | (A-4) | — | — | — | — | 44 | — | — | — | — | — |
|  |  | (A-5) | — | — | — | — | — | 44 | — | — | — | — |
|  |  | (A'-1) | — | — | — | — | — | — | — | — | — | — |
|  |  | (A'-2) | — | — | — | — | — | — | — | — | — | — |
|  |  | (A'-3) | — | — | — | — | — | — | — | — | — | — |
|  |  | (A'-4) | — | — | — | — | — | — | — | — | — | — |
|  | Reactive compound (B) | (B-1) | — | — | 1 | 1 | 1 | 1 | — | — | 0.1 | 2 |
|  |  | (B-2) | — | — | — | — | — | — | — | — | — | — |
|  |  | (B-3) | — | — | — | — | — | — | — | — | — | — |
|  |  | (B-4) | — | — | — | — | — | — | — | — | — | — |
|  |  | (B-5) | — | — | — | — | — | — | — | — | — | — |
|  |  | (B-6) | — | — | — | — | — | — | — | — | — | — |
|  |  | (B-7) | — | — | — | — | — | — | — | — | — | — |
|  |  | (B-8) | — | — | — | — | — | — | — | — | — | — |
|  |  | (B-9) | — | — | — | — | — | — | 5 | 7 | — | — |
|  |  | (B-10) | — | — | — | — | — | — | — | — | — | — |
|  |  | (B-11) | 3 | — | — | — | — | — | — | — | — | — |
|  |  | (B-12) | — | 3 | — | — | — | — | — | — | — | — |
|  | Resin (C) | (C-1) | — | — | 45 | 45 | 45 | 45 | 75 | 75 | 45 | 10 |
|  |  | (C-2) | — | — | — | — | — | — | — | — | — | — |
|  |  | (C-3) | — | — | — | — | — | — | — | — | — | — |
|  |  | (C-4) | 43 | — | — | — | — | — | — | — | — | — |
|  |  | (C-5) | — | 43 | — | — | — | — | — | — | — | — |
|  |  | (C-6) | — | — | — | — | — | — | — | — | — | — |
|  |  | (C-7) | — | — | — | — | — | — | — | — | — | — |
|  | Surfactant (D) | (D-1) | 10 | 10 | 10 | 10 | 10 | 10 | 15 | 15 | 10 | 10 |
| Weight ratio (A)/(B) |  | (A) | 93.6 | 93.6 | 97.8 | 97.8 | 97.8 | 97.8 | 50 | 30 | 99.8 | 97.5 |
|  |  | (B) | 6.4 | 6.4 | 2.2 | 2.2 | 2.2 | 2.2 | 50 | 70 | 0.2 | 2.5 |
| Emulsion stability (g) |  |  | 0 | 0 | 0 | 0 | 0 | 0 | 0 | 0 | 0 | 0 |
| Sizing properties (cm) |  |  | 17.3 | 16.9 | 16.0 | 14.3 | 13.6 | 13.5 | 13.0 | 13.0 | 15.1 | 15.5 |
| Fluffing (mg) |  |  | 5.6 | 6.0 | 4.7 | 2.4 | 3.8 | 3.4 | 3.9 | 7.0 | 7.3 | 6.2 |
| Tensile strength (MPa) |  |  | 2642 | 2611 | 2636 | 3150 | 3098 | 3144 | 2606 | 2450 | 2506 | 2607 |

TABLE 3

|  |  |  | Comparative Examples |  |  |  |  |  |  |  |
|---|---|---|---|---|---|---|---|---|---|---|
|  |  |  | 1 | 2 | 3 | 4 | 5 | 6 | 7 | 8 |
| Fiber sizing agent composition (weight %) | Polyester resin (A) | (A-1) | 45 | — | — | — | — | — | — | — |
|  |  | (A-2) | — | — | — | — | — | — | — | — |
|  |  | (A-3) | — | — | — | — | — | — | — | — |
|  |  | (A-4) | — | — | — | — | — | — | — | — |
|  |  | (A-5) | — | — | — | — | — | — | — | — |
|  |  | (A'-1) | — | — | 44 | — | — | — | — | — |
|  |  | (A'-2) | — | — | — | 44 | — | — | — | — |
|  |  | (A'-3) | — | — | — | — | 44 | — | — | — |
|  |  | (A'-4) | — | — | — | — | — | 44 | — | — |
|  | Reactive compound (B) | (B-1) | — | 2 | 1 | 1 | 1 | 1 | — | — |
|  |  | (B-2) | — | — | — | — | — | — | — | — |
|  |  | (B-3) | — | — | — | — | — | — | — | — |
|  |  | (B-4) | — | — | — | — | — | — | — | — |
|  |  | (B-5) | — | — | — | — | — | — | — | — |
|  |  | (B-6) | — | — | — | — | — | — | — | — |
|  |  | (B-7) | — | — | — | — | — | — | — | — |
|  |  | (B-8) | — | — | — | — | — | — | — | — |
|  |  | (B-9) | — | — | — | — | — | — | — | — |
|  |  | (B-10) | — | — | — | — | — | — | — | — |
|  |  | (B-11) | — | — | — | — | — | — | — | — |
|  |  | (B-12) | — | — | — | — | — | — | — | — |
|  | Resin (C) | (C-1) | 45 | 88 | 45 | 45 | 45 | 45 | — | 16 |
|  |  | (C-2) | — | — | — | — | — | — | — | — |
|  |  | (C-3) | — | — | — | — | — | — | — | — |
|  |  | (C-4) | — | — | — | — | — | — | — | — |
|  |  | (C-5) | — | — | — | — | — | — | — | — |

TABLE 3-continued

| | | Comparative Examples | | | | | | | |
|---|---|---|---|---|---|---|---|---|---|
| | | 1 | 2 | 3 | 4 | 5 | 6 | 7 | 8 |
| | (C-6) | — | — | — | — | — | — | 85 | — |
| | (C-7) | — | — | — | — | — | — | — | 64 |
| Surfactant (D) | (D-1) | 10 | 10 | 10 | 10 | 10 | 10 | 15 | 20 |
| Weight ratio (A)/(B) | (A) | 100 | 0 | 97.8 | 97.8 | 97.8 | 97.8 | 0 | 0 |
| | (B) | 0 | 100 | 2.2 | 2.2 | 2.2 | 2.2 | 0 | 0 |
| Emulsion stability (g) | | 0 | 2 | 0 | 3.0 | 2.5 | 1.5 | 3.2 | 2.8 |
| Sizing properties (cm) | | 14.3 | 13.2 | 10.5 | 16.5 | 16.5 | 14.0 | 9.3 | 8.9 |
| Fluffing (mg) | | 4.8 | 25.9 | 15.7 | 22.6 | 22.8 | 26.8 | 22.4 | 26.7 |
| Tensile strength (MPa) | | 2387 | 2301 | 2101 | 2340 | 2011 | 2089 | 2552 | 2607 |

As is clear from Table 2 and Table 3, the fiber bundles treated with the fiber sizing agent compositions of the present invention (Examples 1 to 20) are excellent in emulsion stability, sizing properties, and fluffing properties. Further, the composite materials made of the fiber bundles and the matrix resin are excellent in tensile strength. As shown in Comparative Examples 1 and 2, the composite materials free of either the polyester resin (A) or the reactive compound (B) exhibit sufficient sizing properties but are poor in tensile strength. As shown in Comparative Example 2, the composite material free of polyester resin exhibit insufficient emulsion stability and insufficient fluffing properties. As shown in Comparative Examples 3 to 6, the sizing agents in which the viscosity of the polyester resin is too low or too high may impart excellent emulsion stability in some cases but cannot sufficiently suppress fluffing or impart sufficient tensile strength. As shown in Comparative Examples 7 and 8, the sizing agents free of both the polyester resin (A) and the reactive compound (B) may impart excellent tensile strength in some cases but cannot improve sizing properties and tensile strength in a balanced manner. In addition, the emulsion stability is poor and the fluffing is increased in Comparative Examples 7 and 8.

INDUSTRIAL APPLICABILITY

The fiber-reinforced composite materials obtained by molding the composite intermediates made of a matrix resin and fiber bundles produced using the fiber sizing agent compositions of the present invention can be suitably used, for example, as various materials for civil engineering and construction, materials for transportation machines, materials for sporting goods, and materials for power-generating equipment.

The invention claimed is:

1. A fiber sizing agent composition comprising:
a polyester resin (A);
a reactive compound (B), and
a resin (C) other than the polyester resin (A),
wherein the polyester resin (A) is a polyester resin having an HLB of 4 to 18 and a viscosity at 30° C. of 10 to 1,000,000 Pa·s,
the reactive compound (B) is a blocked isocyanate,
a blocking agent for the blocked isocyanate is an amine,
the resin (C) is at least one selected from the group consisting of polyester resins other than the polyester resin (A), epoxy resins, polyurethane resins, (meth) acrylic resins, unsaturated polyester resins, and polyamide resins,
the weight ratio of the polyester resin (A) to the reactive compound (B) [(A)/(B)] in the fiber sizing agent composition is 99.9/0.1 to 10/90, and
the weight ratio of the reactive compound (B) to the resin (C) [(B)/(C)] in the fiber sizing agent composition is 1/5 to 1/450.

2. The fiber sizing agent composition according to claim 1,
wherein the polyester resin (A) has an ester group concentration of 10 mmol/g or lower based on the weight of the polyester resin (A).

3. The fiber sizing agent composition according to claim 1,
wherein the polyester resin (A) is a condensate of a dicarboxylic acid (a1) and/or a dicarboxylic anhydride (a2) and one or more diols (b).

4. The fiber sizing agent composition according to claim 3,
wherein at least one of the diols (b) is a diol (b1) having an average of 5 to 200 oxyethylene groups.

5. The fiber sizing agent composition according to claim 4,
wherein the diol (b1) is an ethylene oxide adduct of bisphenol A and/or an ethylene oxide adduct of ethylene glycol.

6. The fiber sizing agent composition according to claim 1,
wherein the blocking agent for the blocked isocyanate is dimethylamine.

7. The fiber sizing agent composition according to claim 1,
wherein the resin (C) is an epoxy resin.

8. The fiber sizing agent composition according to claim 1, further comprising a surfactant (D),
wherein the surfactant (D) is at least one selected from the group consisting of nonionic surfactants, anionic surfactants, cationic surfactants, and amphoteric surfactants.

9. A fiber sizing agent dispersion comprising:
water or an organic solvent; and
the fiber sizing agent composition according to claim 1 dispersed in the water or the organic solvent.

10. A method for producing fiber bundles, the method comprising:
treating at least one type of fibers selected from the group consisting of carbon fibers, glass fibers, aramid fibers, ceramic fibers, metal fibers, mineral fibers, and slug fibers with the fiber sizing agent dispersion according to claim 9 to obtain fiber bundles.

11. A composite intermediate comprising:
the fiber bundles obtained by the production method according to claim 10 and a matrix resin.

12. A fiber-reinforced composite material,
which is obtained by molding the composite intermediate according to claim 11.

13. A fiber sizing agent solution comprising:
   water or an organic solvent; and
   the fiber sizing agent composition according to claim 1 dissolved in the water or the organic solvent.

14. A method for producing fiber bundles, the method comprising:
   treating at least one type of fibers selected from the group consisting of carbon fibers, glass fibers, aramid fibers, ceramic fibers, metal fibers, mineral fibers, and slug fibers with the fiber sizing agent solution according to claim 13 to obtain fiber bundles.

15. A composite intermediate comprising:
   the fiber bundles obtained by the production method according to claim 14 and a matrix resin.

16. A fiber-reinforced composite material,
   which is obtained by molding the composite intermediate according to claim 15.

* * * * *